Patented Mar. 13, 1951

2,544,691

UNITED STATES PATENT OFFICE 2,544,691

COATING COMPOSITIONS COMPRISING COPOLYMERS OF ACRYLIC ESTERS AND DICARBOXYLIC ACID ESTERS

Joseph H. Kugler and William E. Lundquist, St. Paul, Minn., assignors to Minnesota Mining & Manufacturing Company, St. Paul, Minn., a corporation of Delaware No Drawing. Application December 23, 1943, Serial No. 515,462

9 Claims. (Cl. 260—78.5)

This invention relates to finishes for certain porous materials, especially leather, and involves the use of emulsions of certain elastic or plastic materials, particularly soft polymers or copolymers of esters of acrylic acid, e. g. with a non-acrylic material such as a maleate.

Acrylate ester polymers, such as methyl, ethyl, propyl or butyl acrylate polymers, by themselves, tend to soften on heating and become stiff and brittle on cooling. Polymers of acrylate esters of short carbon chain alcohols in particular appear to become stiff and brittle at temperatures of the order of zero degrees Fahrenheit or lower, and this may explain the limited utility of leather treated with compositions comprising these polymers, since it is necessary for shoes and other leather articles to be resistant to cracking and breaking when flexed at these temperatures. Nonetheless the only suggestion of acrylate-bearing materials for treatment of leather or the like has been directed toward the use of polymeric methyl, ethyl and/or propyl acrylate or the like, possibly because of an assumption that these compounds would have better penetration characteristics.

Esters of longer carbon chain alcohols have not been used or suggested as leather finishes, to the best of our knowledge. Polymers of such esters, in film form, are generally regarded as rather soft and weak at or slightly above ordinary room temperature.

We have now found that copolymers of acrylate esters with certain non-acrylic monomers, and also polymers of acrylate esters of higher alcohols having five or more carbon atoms in the alkyl group may be used to advantage in the finishing of leather, and certain other porous or sheeted materials, and that leather or the like so treated will show improved resistance to cracking when flexed at low temperatures, as well as possessing other advantages.

An object of our invention is therefore the production of a composition for use in finishing leather or the like comprising an emulsion of soft acrylate polymer or copolymer which has improved flexibility at low temperatures. Another object of our invention is the production of compositions for use as finishes on leather or the like which when applied thereto have improved adhesion to the leather, and provide resistance to water and oils, satisfactory appearance even with fewer than the customary number of applications, and good flexibility, elasticity and strength over a wide range of temperatures. A further object of our invention is the production of such coating compositions from soft acrylate polymers or copolymers the properties of which may be readily controlled. A still further object is the production of suitable polymers or copolymers from less expensive and more readily available raw materials. Another object is the production of an improved leather or sheeted product. These and other objects and advantages will appear from the application taken as a whole.

Although suitable combinations of properties may be obtained by the use of certain of the higher acrylates, particularly the branched-chain acrylates, for example isoamyl acrylate or 2-ethyl butyl acrylate, we prefer to copolymerize the acrylates of alcohols of fewer carbon atoms with other copolymerizable compounds, and particularly with maleic and fumaric acid esters of alcohols having three or more carbon atoms. In addition, we prefer to include in the mixture to be copolymerized small percentages of difunctional cross-linking agents, for example diamyl ethylene di-maleate (or di-fumarate).

Esters of maleic and fumaric acids may be prepared by heating maleic or fumaric acid with the desired alcohol and a suitable catalyst such as para toluene sulfonic acid under reflux, and finally removing water and excess alcohol by distillation, according to well-known methods. When maleic acid (or preferably maleic anhydride) is employed, the maleate is first formed; but long continued heating under acid conditions (or brief heating in the presence of about 1% of piperidine or the like) converts all or part of the maleate to the fumarate. We therefore contemplate the use not only of the pure maleate or fumarate, but also of mixtures of the two, particularly as prepared from maleic anhydride. Accordingly, where maleates are herein mentioned, mixtures containing varying percentages of fumarates may be substituted.

While polymerization may be carried out in organic solution or even in bulk, and the resulting polymer subsequently dispersed in an aqueous medium, we prefer to carry out the polymerization directly in the aqueous medium.

We may prepare a preferred composition for treating or coating porous sheet material, by employing an emulsion of a copolymer of methyl acrylate and n-hexyl maleate, which in turn may be prepared as follows, all parts being by weight.

Twenty-five hundred parts of water, 12½ parts of "Duponol ME" flakes (an alcohol sulfate, largely lauryl sulfate, sold by E. I. du Pont de Nemours & Co.), 12½ parts of ammonium persulfate and 5 parts of concentrated aqueous ammonia are charged into a glass-lined reaction vessel equipped with a stirrer, temperature indicator and reflux condenser, and the mixture is heated with stirring to about 70° C. A mixture of 1200 parts of methyl acrylate and 300 parts of n-hexyl maleate is then added slowly, in order to maintain a moderate rate of polymerization. The polymerization is finally completed at 85° C. after 3 hours' reaction time, and yields a fine particle size aqueous emulsion of a soft acrylate-maleate copolymer which may be further compounded and used as a finishing composition for leather and the like.

Since these polymerization reactions are exothermic, it is necessary to control the temperature, either by cautious addition of the reactant mixture as described above, or by addition of one of the reactants in small amounts, or by other suitable methods. For example, the following method may be used, as in the preparation of a suitable copolymer from methyl acrylate and 2-ethyl butyl fumarate, together with a minor percentage of diamyl ethylene dimaleate as a cross-linking agent.

Eighteen hundred parts by weight of water, 18 parts of "Duponol ME" flakes, 18 parts of sodium bicarbonate, and 9 parts of ammonium persulfate are charged into the reaction vessel previously indicated. Two hundred eighty parts of 2-ethyl butyl fumarate, 300 parts of methyl acrylate, and 18 parts of diamyl ethylene dimaleate are added and the mixture is heated with stirring to about 70° C. At this point some cooling may be necessary. As soon as the temperature returns to 70° C., an additional 200 parts of methyl acrylate are added and the mixture is again heated. After the temperature returns to 70° C., a final 200 parts of methyl acrylate are added and the mixture is heated to complete the polymerization.

A cross-linked copolymer of 50 parts by weight of methyl acrylate, 50 parts of ethyl acrylate, and 0.06 part of diallyl succinate, prepared in emulsion form by either of the processes above described, is somewhat firmer at high temperatures while still being flexible and elastic at temperatures of the order of zero degrees F. It forms a suitable material for use in our novel treating and/or finishing compositions for leather and the like.

Isoamyl acrylate may also be polymerized in emulsion form. It forms a soft, tacky polymer which may be used in leather finishes, although copolymerization with for example up to about 3 percent of a cross-linking agent improves its strength at elevated temperatures.

Isobutyl acrylate may be copolymerized with 5–10 percent of 2-ethyl butyl fumarate. The emulsion may be used in treatments or finishes for leather or the like; the copolymer has also been found to possess advantages as a permanently tacky adhesive, for example as an adhesive in the manufacture of pressure-sensitive adhesive tapes. In adhesive tapes, a firming agent, e. g. a pigment, is sometimes desirably blended with such a copolymer. The use during the making of such a copolymer of a small amount, e. g. 0.5 percent, of a chemical cross-linking agent, as herein elsewhere mentioned, will also contribute a firming action, desirable in pressure-sensitive adhesives for various uses.

For the treatment of paper or like adhesive tape backings, we have found that a copolymer of for example 70 parts by weight of methyl acrylate with 30 parts of 2-ethyl butyl fumarate, often advantageously cross-linked with 1% or so of a chemical cross-linking agent, possesses advantages. Where such treatment is used, a back-size treatment with shellac or other material having relatively low adhesion to the particular pressure-sensitive adhesive of the tape may be employed. Such a paper treatment gives desirable unification of the paper fibers, pliability of the tape, and other advantages.

In general, maleates and fumarates of alcohols having three or more carbon atoms copolymerize with acrylates, to the preferred extent of not more than about 35 parts of maleate or fumarate to 65 parts of acrylate, to form copolymers which at room temperatures are softer than, or at least as soft as, the same acrylates polymerized alone, also which are more pliable and flexible at low temperatures, and possess other advantages in the relations or combinations herein contemplated. Small amounts of other materials, e. g. vinyl acetate, may also be copolymerized with the acrylate and the maleate (and/or fumarate). Cross-linking agents, such as diallyl succinate, diamyl ethylene dimaleate, or the like, in small percentages, e. g. 1 or 2 percent or less, also reduce the temperature susceptibility, i. e. provide reduced brittleness at low temperatures, while at the same time improving the strength at elevated temperatures, without injuring the products for the purposes here intended. It is thus apparent that polymers are thus hereby "tailor-made" for various uses and purposes. Variations in properties also can be controlled with nicety, within desired ranges. It is also possible, where desirable due to variations in relative cost and availability of the various reactants, to duplicate the essential properties of one copolymer with a different copolymer by proper selection of reactants on the basis of the information herein disclosed.

Coating compositions for leather and the like may be formed or compounded from the emulsions indicated above, either alone or by the addition of suitable dyes, pigments, extenders, binding agents, etc., and which may include casein, blood albumin, sulfonated castor oil, titanium oxide, iron oxide, and the like.

For example, 200 parts by weight of zinc sulfide, 100 parts of sulfonated castor oil, and 1000 parts of a 1% solution of egg albumin in water, are mixed together and passed through a colloid mill. To this mixture are then added 300 parts of the emulsion of the copolymer of methyl acrylate, 2-ethyl butyl fumarate, and diamyl ethylene dimaleate, produced as above described, and which has approximately one part of polymer for each two parts of aqueous vehicle. Further amounts of water may be added if desired, and the composition may be applied to leather or the like by spraying, brushing, or other known method.

As another example, we may use 200 parts by weight of the emulsion of the copolymer of methyl acrylate and n-hexyl maleate, prepared as above described, which amount corresponds to approximately 70 parts by weight of the dry copolymer. To this we may add a suspension, prepared as before in a colloid mill, or in a ball mill, or by other means where preferred, of 200 parts of a red iron oxide pigment and 10 parts of toluidine toner, dispersed in 150 parts of sulfonated castor oil and from 1000 to 1500 parts of a one percent solution of methyl cellulose in water. This composition, diluted with water where desired, may be applied to leather to provide an advantageous finish which will not crack when flexed at low temperatures, and which has other advantages as hereinbefore indicated.

In the treatment of other porous or absorptive sheet materials, as in connection with the manufacture of adhesive tape, it will be understood that the emulsion of polymer or copolymer may be used alone, or merely with a pigment or a resin modifier, or in other modified forms as desired. It will also be understood that subsequent treatment of such treated porous sheets may be utilized, for example heating, and/or treatment with small amounts of solvent or solvent vapor, so as to produce a desirable continuity of film, water resistance, unification of the fibers or other elements of the sheet, or for other purposes.

In addition to leather, artificial leather sheets, bituminous treated fabrics, cloth, paper, other porous sheets, non-fibrous films or sheets, and the like, may be treated or coated with compositions herein illustrated, to effectuate one or more advantages, such as exemplified herein. Where an adhesive tape is being produced the backing may be treated and/or the pressure-sensitive adhesive layer or coat may be made in accordance with the respective illustrative teaching herein presented.

All modifications and/or variations of the several aspects of the present invention, which likewise distinguish over the prior art, are contemplated.

This application is related to our copending application Serial No. 88,688, filed April 20, 1949 as a continuation-in-part of the present application.

What we claim is:

1. Leather having a finish coating comprising a pigment and a copolymer of about 65–80 parts by weight of methyl acrylate and correspondingly about 35–20 parts by weight of n-hexyl maleate.

2. Porous sheet material coated with an adherent composition comprising a copolymer of 65–80 parts by weight of methyl acrylate and correspondingly about 35–20 parts by weight of a hexyl maleate.

3. Porous sheet material coated with an adherent composition comprising a copolymer of methyl acrylate and hexyl maleate in approximately 65:35 weight ratio.

4. Porous sheet material coated with an adherent composition comprising a copolymer of about 65–80 parts by weight of methyl acrylate and correspondingly about 35–20 parts by weight of 2-ethylbutyl maleate.

5. Porous sheet material coated with an adherent composition comprising a copolymer of about 65–80 parts by weight of a lower acrylate ester and correspondingly about 35–20 parts by weight of a copolymerizable monomer having the formula $C_6H_{13}OCOCH=CHCOOC_6H_{13}$.

6. A composition for use in coating porous sheet material comprising an aqueous dispersion of a copolymer of about 65–80 parts of a lower acrylate ester with correspondingly about 35–20 parts of a compound of the formula

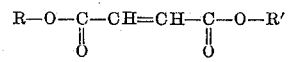

where R and R' are alkyl groups having at least three carbon atoms and not more than six carbon atoms.

7. A composition having utility in coating porous sheet material comprising an aqueous dispersion of a copolymer of about 65–80 parts by weight of methyl acrylate and correspondingly about 35–20 parts by weight of a compound of the formula ROCOCH=CHCOOR' where R and R' are alkyl groups having at least three carbon atoms and not more than six carbon atoms.

8. Composition according to claim 7 wherein the alkyl groups R and R' are $C_6H_{13}$-groups.

9. Porous sheet material coated with an adherent composition comprising a copolymer of about 65–80 parts by weight of a lower acrylate ester and correspondingly about 35–20 parts by weight of a compound of the formula

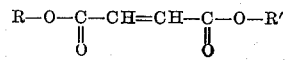

where R and R' are alkyl groups having at least three carbon atoms and not more than six carbon atoms.

JOSEPH H. KUGLER.
WILLIAM E. LUNDQUIST.

REFERENCES CITED

The following references are of record in the file of this patent:

UNITED STATES PATENTS

| Number | Name | Date |
|---|---|---|
| 1,269,292 | McIntosh | June 11, 1918 |
| 2,046,886 | Strain | July 7, 1936 |
| 2,123,599 | Fikentscher et al. | July 12, 1938 |
| 2,137,636 | Barrett | Nov. 22, 1938 |
| 2,156,335 | Geller | May 2, 1939 |
| 2,168,534 | Nuesslein et al. | Aug. 8, 1939 |
| 2,321,942 | Rothrock | June 15, 1943 |
| 2,356,879 | Pense et al. | Aug. 29, 1944 |
| 2,365,020 | Stillwell | Dec. 12, 1944 |

OTHER REFERENCES

Ser. No. 367,262, Pense et al. (A. P. C.), published June 1, 1943.